United States Patent

Fish et al.

[15] 3,652,443

[45] Mar. 28, 1972

[54] DEPOSITION APPARATUS

[72] Inventors: Frank H. Fish, Westwood; Edward P. McLaughlin, Braintree, both of Mass.

[73] Assignee: The Gillette Company, Boston, Mass.

[22] Filed: Aug. 25, 1970

[21] Appl. No.: 66,842

[52] U.S. Cl. ............................................... 204/298, 204/192

[51] Int. Cl. ............................................... C23c 15/00

[58] Field of Search ............................................... 204/192, 298

[56] References Cited

UNITED STATES PATENTS

| | | | |
|---|---|---|---|
| 3,410,775 | 11/1968 | Vratny | 204/298 |
| 3,458,426 | 7/1969 | Rausch et al. | 204/298 |
| 3,480,483 | 11/1969 | Wilkinson et al. | 204/192 |
| 3,501,393 | 3/1970 | Wehner et al. | 204/298 |
| 3,528,902 | 9/1970 | Wasa et al. | 204/192 |
| 3,562,140 | 2/1971 | Skinner et al. | 204/298 |

*Primary Examiner*—John H. Mack
*Assistant Examiner*—Sidney S. Kanter
*Attorney*—Willis M. Ertman

[57] ABSTRACT

Deposition apparatus includes a vacuum chamber with a target, a substrate holder and a screen disposed in the chamber. The screen has graduated transparency and is disposed between the target and the substrate holder. Material is transferred from the target through the screen to a substrate on the holder and the graduated transparency of the screen is coordinated with the transfer process so that the thickness of the film deposited on the substrate is substantially uniform.

14 Claims, 5 Drawing Figures

DEPOSITION APPARATUS

SUMMARY OF INVENTION

This invention relates to deposition apparatus and more particularly to improved apparatus for the deposition of thin films on substrate materials.

Frequently it is desired to deposit a uniform thin film on a substrate. Also in commercial production, it is desirable that the apparatus be capable of processing a large number of substrates so that the cost of individual substrates may be minimized while composition control, film thickness uniformity and deposition rates are maintained or improved. The deposited thin film may be useful for various purposes, for example in electronic devices the thin film may be an electrically insulating material or a semiconductor material. In other applications, the thin film may protect a surface. The deposition of a thin film less than 600 A in thickness of a corrosion-resistant material on the sharpened edges of a razor blade provides a layer that improves the shaving characteristics of the razor blade. Such thin films must be applied to the razor blades with precision and uniformity in mass production quantities for commercial practicability, and it is an object of this invention to provide novel and improved apparatus for use in connection with the manufacture of razor blades.

Another and more general object of the invention is to provide novel and improved thin film deposition apparatus in which thin film material may be deposited on substrate material with greater uniformity in mass production quantities.

Another object of the invention is provide novel and improved sputtering apparatus for depositing a thin film which enables faster deposition rates and/or lower power levels.

A further object of the invention is to provide novel and improved sputtering apparatus for use in the deposition of thin films on substrates which have longer life and reduced maintenance and are capable of being rehabilitated.

In accordance with the invention there is provided deposition apparatus that includes means defining a vacuum chamber, a source of material, substrate holder means spaced from the source, a screen disposed between the source and the substrate holder, and power supply means connected to the chamber for causing transfer of material from the source for deposition on the substrate held by the substrate support means, the transferred material passing through the screen. The open area of the screen is graduated along one axis so that the screen has graduated transparency to the transferred material.

In preferred embodiments, the screen has a first degree of transparency at a point adjacent the power supply connection to the chamber and greater transparency at a point remote from the power supply connection and the vacuum port is at a location in the chamber opposite the power supply connection. It is preferred that the screen have openings that are larger than four mesh in size, and in a particular embodiment the upper end of the screen has openings that are two mesh in size while the lower end of the screen has openings of one mesh size.

In a particular embodiment there is provided apparatus for applying a thin, uniform, corrosion-resistant film to the sharpened edges of razor blades. Disposed in the chamber is structure for supporting a multiplicity of razor blades with their bodies in face to face contact and their sharpened edges aligned with one another in a stack. An elongated target member is disposed along a line parallel to the axis of the stack support structure and the screen is interposed between the target and the stack support structure. The screen effectively is electrically connected to the stack support structure. Energization of the power supply establishes an ion plasma within the chamber and causes ions in the chamber to bombard the target and transfer material from the target member in a sputtering operation for passage through the screen for application to the sharpened edges of the razor blades to form a thin adherent corrosion-resistant coating on the sharpened edges of the razor blades in the stack.

Apparatus constructed in accordance with the invention enables the deposition of thin films on substrates with greater uniformity and efficiency and has an increased use life. Other objects, features and advantages will be seen as the following description of a particular embodiment progresses, in conjunction with the drawings, in which.

DESCRIPTION OF PARTICULAR EMBODIMENT

Figure 1:
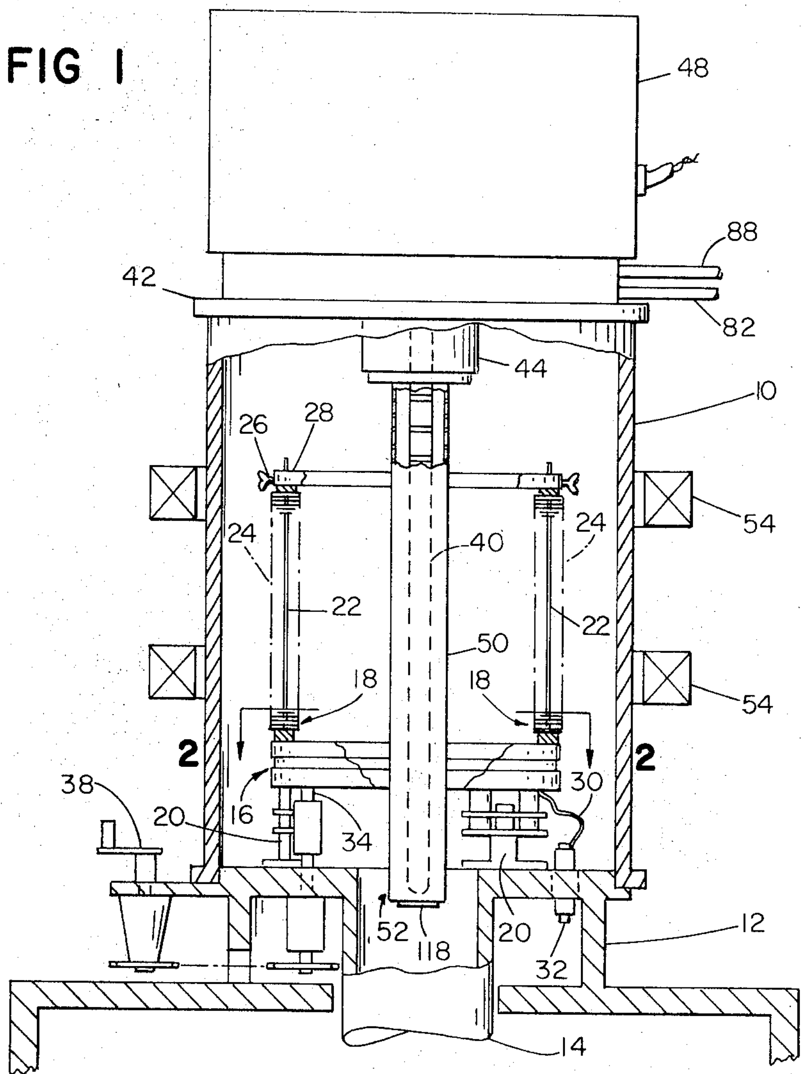
FIG. 1 is a sectional view of apparatus constructed in accordance with the invention.
Figure 2:
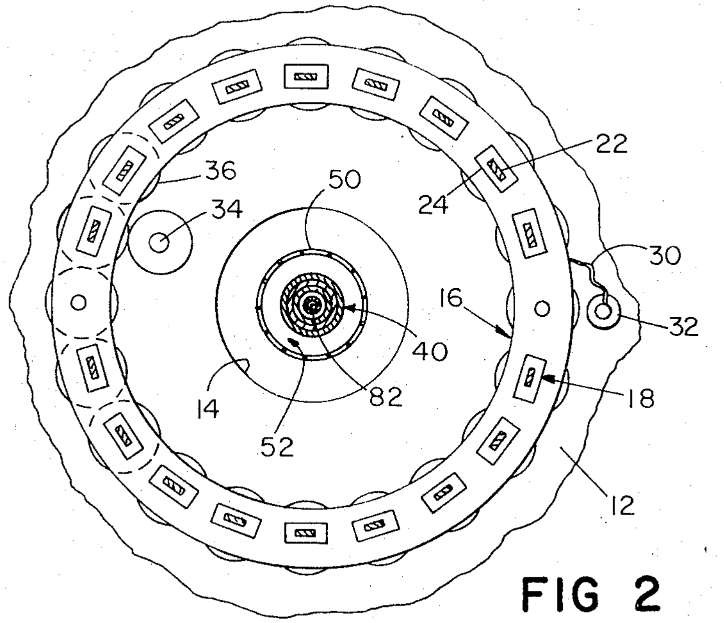
FIG. 2 is a sectional view of a portion of the apparatus shown in FIG. 1, taken along the line 2—2 of FIG. 1.

The apparatus shown in FIG. 1 includes a stainless steel chamber 10, 24 inches in diameter and 32 inches high, that cooperates with base 12. Base 12 is coupled through port 14 to a suitable vacuum system (not shown). Mounted in chamber 10 on ring assembly 16 for rotation about their own vertical axes are 18 razor blade stack support structures 18. Assembly 16 is electrically insulated from base 12 by post structures 20. Each blade stack support structure 18 includes a base and a relatively rigid elongated aligning leaf or knife 22 secures the stack of blades 24 in position and in turn is secured to an upper aligning ring 28. An electrical connection to the blade stacks 24 is made via conductor 30 and feed through connection 32 in the base 12. Drive shaft 34 is coupled to ring assembly 16 and enables the blade stacks 24 to be rotated via gears 36 in response to operation of drive mechanism 38. In a typical processing run, each stack is 12 inches long and contains 3,000 double edged blades or 1,200 single edge injector blades. The sharpened edges of the blades in each stack are 6 ¾inches from the axis of chamber 10. Obviously, other support structures including those for different types of substrates may be substituted for these support structures in the practice of the invention.

Also mounted within chamber 10 coaxially with the chamber axis is a target rod 40 that is initially 1 ¼ inches in diameter. Rod 40 is suspended from the top plate 42 of chamber 10 by an insulator structure within structure 44 that provides a dark space shield that protects the insulator. The exposed length of target rod 40 below shield 44 in this embodiment is 29 inches and that exposed length is positioned symmetrically with respect to the stacks of razor blades 24. Connected to the target rod 40 is a matching network and 13.56 mHz. RF power supply mounted within housing 48.

A stainless steel cylinder 50, 3 ¼inches in diameter and of 1/16 inch thick sheet stock is suspended from shield structure 44 and encloses target rod 40. A stainless steel plate 118 is secured at the lower end 52 of control cylinder 50. Two Helmholtz coils, diagrammatically indicated at 54, surround chamber 10 and, when energized, create a vertical magnetic field of about 70 Gauss magnitude in chamber 10. The target rod 40 may take a variety of forms depending on the particular application or the type of film to be formed, and in this particular embodiment it is formed of alternating exposed sections of chromium and platinum equally spaced so that the exposed surface area of the target assembly is 19 percent platinum and 81 percent chromium.

Figure 3:
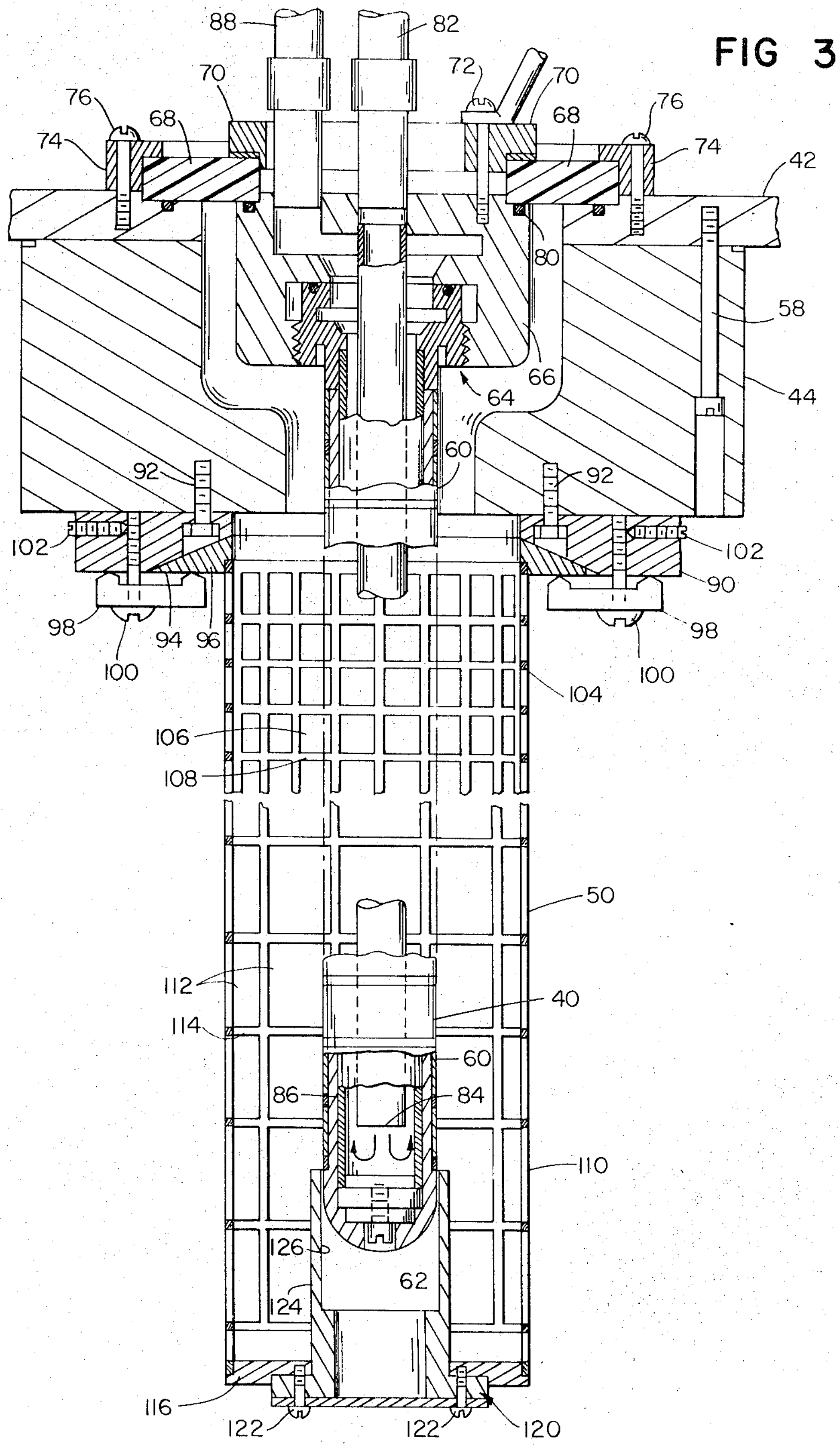
FIG. 3 is an enlarged sectional view of a target structure and screen arrangement employed in the apparatus shown in FIG. 1.

With reference to FIG. 3, dark space shield 44 is supported form top plate 42 by bolts 58. Target 40 includes cylindrical member 60, a spherical surface 62 at one end and coupling structure 64 at its other end that is threadedly received in support block 66. Electrical insulator disc 68 is clamped to support member 66 by cover ring 70 and bolts 72. In similar manner, the outer periphery of insulator disc 68 is clamped to top plate 42 by retainer ring 74 and bolts 76. Gasket 78 and O-rings 80 provide seals. A coaxially located coolant supply tube 82 extends through support 66 and target rod cylinder 40 to the lower discharge end 84. An annular return passageway, the outer wall of which is defined by sleeve 86 on the inner surface of target cylinder 40 provides a return passage for coolant water which flows up through coupling 64 and support 66 for passage through conduit 88. RF power is applied to target rod 40 through a copper tube connection from matching network to bolt 72.

Cylindrical screen 50 is secured to shield 44 by spacer disc 90 and bolts 92. Spacer disc 90 includes, in its lower surface, a concave spherical surface 94 of 5 inches in radius. Cooperating with surface 94 is a corresponding convex spherical surface of flange 96 secured at the upper end of screen 50. Clamp bars 98 secured by bolts 100 and lock members 102 hold the spherical surface of flange 96 against surface 94 of spacer 90.

Screen 50 is a cylinder of stainless steel which has an upper section 104, 19 and ½ inches in length, in which are formed square apertures 106 that are seven-sixteenths inch on each side (2 mesh) as defined by spacer members 108, each one-sixteenth inch in width. The adjacent lower section 110, 9 inches in length, has square apertures 112 formed in it that are fifteen-sixteenths inch on a side (one mesh) and are defined by members 114 that are also one-sixteenth inch in width. Secured about one-half inch below the end of section 110 is an end plate 116 whose lower surface is located about one inch below the spherical end 62 of target rod 40. Plate 116 has an aperture in it which is closed by plate 118 (FIG. 1) when the system is in use. An aligning fixture 120, as shown in FIG. 3, is secured to end plate 116 by bolts 122 for purposes of alignment. Fixture 120 has a cylindrical extension 124 and its inner bore 126 extends past the cylindrical end 62 of target rod 40 when so secured.

In assembly, after target rod 40 and dark space shield 44 have been bolted to top plate 42, the screen 50 is positioned with bore 126 of aligning fixture 124 extending over the cylindrical wall of target rod 40 and with clamp bars 98 holding flange 96 against spherical surface 94. The clamp bars 98 are then tightened so that the established coaxial alignment of screen 50 and target rod 40 is maintained. Fixture 120 is then removed and end plate 118 is substituted.

In operation, sharpened blades 24 are placed in stacks on knives 22. The chamber structure 10 is then lowered to base 12 and is evacuated. Flowing argon gas is then introduced so as to maintain a steady state of about 10 microns argon pressure in the chamber which is under continuous evacuation. The blades are then energized with a DC potential applied through connection 30 (the chamber being grounded) and cleaned by glow discharge for 5 minutes. After cleaning, the blade stacks and the chamber are grounded and an RF potential is applied from the power supply to target rod 40. Argon ions are produced which bombard target 40 in a sputtering operation and release atoms of the two metals. The released atoms are deposited on the exposed surfaces in the chamber, including the sharpened blade edges. Deposition rates are a function of applied power when all other pertinent variables are held constant.

As a specific example, 60,000 stainless steel razor blades having the following composition:

| | |
|---|---|
| carbon | 0.54–0.62% |
| chromium | 13.5–14.5% |
| manganese | 0.20–0.50% |
| silicon | 0.20–0.50% |
| phosphorus, max. | 0.025% |
| sulphur, max. | 0.020% |
| nickel, max. | 0.50% max. |
| iron | remainder |

were sharpened to an included solid angle of 24.8°and placed on 18 knives 22.

The pressure in the chamber was reduced to 0.05 micron and a discharge sustaining atmosphere of argon was then bled into the chamber to increase the pressure to 10 microns. A direct current glow discharge was initiated in this argon atmosphere at a voltage of 1,600 volts and a current of 1,100 milliamperes and maintained for 5 minutes. The blade stacks 24 were then connected to ground and 2.5 kilowatts of RF power at a frequency of 13.56 mHz. were applied to rod 40 with the matching network adjusted for zero reflected power for 4 minutes. The RF power was applied 15 seconds before application of the DC power was entirely terminated and was increased gradually to 2.5 kilowatts as the DC power was being reduced. The Helmholtz coils 54 were energized at the same time that the RF power was initially applied. After the end of the 4 minute sputtering interval the blade stacks were turned and the above described cleaning and sputtering steps were repeated. The resulting platinum-chromium alloy coating had a thickness of about 200 A and extended along the entire cutting edge of the blades and back along the final facet for a distance of at least 0.001 inch. After the blades were removed from chamber 10 a coating of polytetrafluoroethylene telomer was applied to the edges of the blades in accordance with the teaching in copending application Ser. No. 384,805, filed July 23, 1964 in the name of Irwin W. Fischbein, now U.S. Pat. No. 3,518,110 issued June 30, 1970. This processing involved heating the blades to a temperature preferably in the range of 590°–806° F. and provided on the cutting edges of the razor blades an adherent coating of solid fluorocarbon polymer. These blades exhibited excellent shaving properties and long shaving life.

Figure 4A:
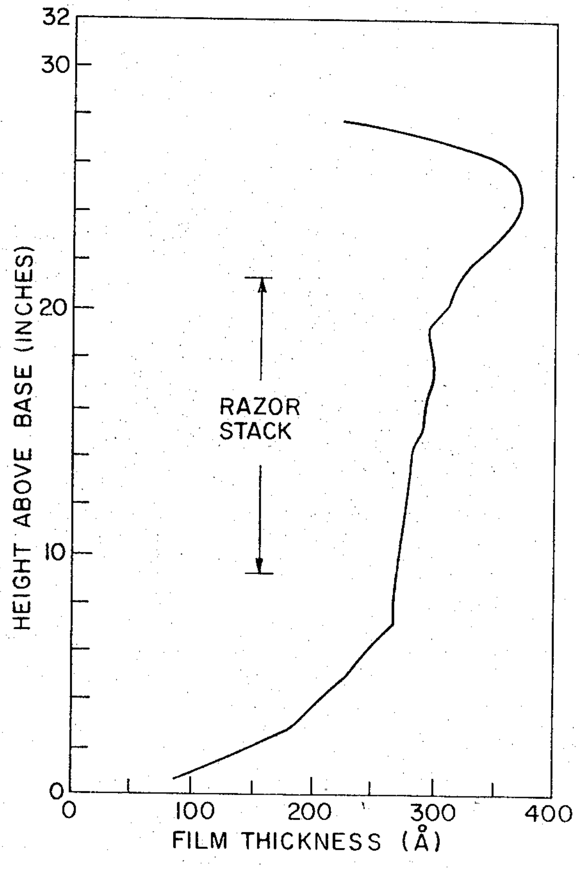
FIG. 4 is a set of graphs indicating characteristics of operation of a prior art system and a system constructed in accordance with the invention.
Figure 4B:
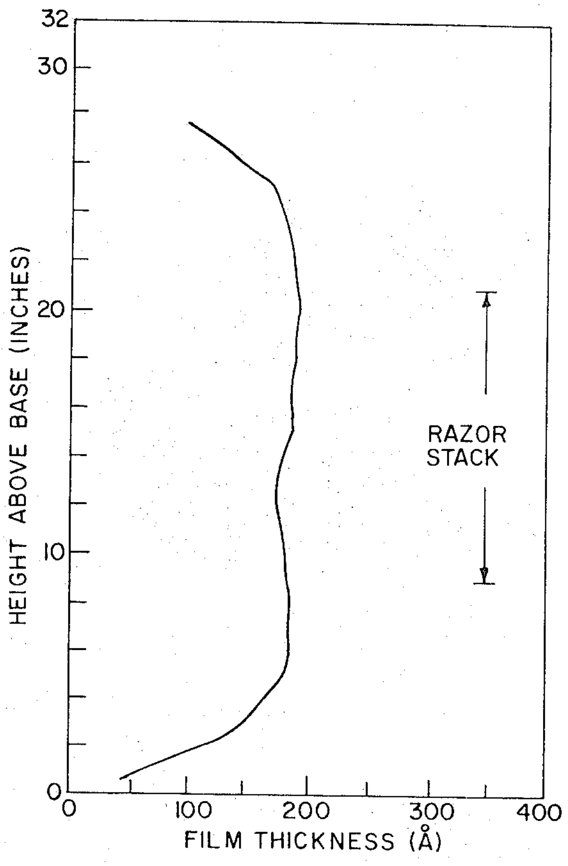

The graphs of FIG. 4 show variation in thickness in Angstroms of a film deposited on a flat substrate as a function of positions along the length of the target with a system as illustrated in FIG. 1 employing a prior art screen (FIG. 4*a*) and the same system employing the above described screen constructed in accordance with the invention (FIG. 4*b*). The screen structure employed in the system that produced the results shown in FIG. 4*a* was a woven stainless steel wire section of uniform ten mesh size throughout its length and had a percent open area of about 55 percent. Sputtering power was applied for 1 and ½ minutes in both cases at a power of 4 kilowatts for the results indicated in FIG. 4*a* and at a power of 2 ½ kilowatts for the results indicated in FIG. 4*b*. As will be seen, a strongly skewed deposition resulted with the uniform ten mesh screen with greater deposition at the top of the substrate and less at the bottom. With the screen shown in FIG. 3, the deposition uniformity was substantially improved.

Further, a screen constructed in accordance with the invention has a longer useful life; is more readily rehabilitated for example by sand blasting to further increase its useful life; permits reduction in the RF power level with consequent lower demands on the target cooling system and possible increased life of the RF generator itself; and provides a substantial cost saving on target rods 40 as their useful life is increased about 40 percent.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. Deposition apparatus comprising means defining a vacuum chamber, an elongated source of material, substrate holder means spaced from said source, a screen disposed between said source and said substrate holder, said screen being electrically connected with said substrate holder means, and power supply means connected to said chamber for causing transfer of material from said source for deposition on a substrate held by said substrate support means, the transferred material passing through said screen, said screen having graduated transparency to transferred material, said transparency being graduated in the axial direction parallel to said elongated source and uniform in a direction perpendicular to said axial direction, so that the thickness of the film deposited on the substrate held on said substrate support means is substantially uniform.

2. The apparatus as claimed in claim 1 wherein said screen has a transparency of at least 4 mesh throughout its area.

3. The apparatus as claimed in claim 1 wherein said screen has a first degree of transparency at a point adjacent the power supply connection to said chamber and greater transparency at a point remote from said power supply connection.

4. The apparatus as claimed in claim 3 wherein said screen has a first degree of transparency at a point adjacent the vacuum connection to said chamber and lesser transparency at a point remote from said vacuum connection.

5. The apparatus as claimed in claim 4 wherein substrate holder means is disposed in a circle around said elongated target and said screen is cylindrical in form.

6. The apparatus as claimed in claim 1 wherein said screen has a first degree of transparency at a point adjacent the vacuum connection to said chamber and lesser transparency at a point remote from said vacuum connection.

7. The apparatus as claimed in claim 1 wherein substrate holder means is disposed in a circle around said elongated source and said screen is cylindrical in form.

8. The apparatus as claimed in claim 1 wherein said power supply means establishes an ion plasma within said chamber for causing ions in said chamber to bombard said source and sputter material from said target for deposition on substrate held by said substrate support means.

9. Apparatus for applying a thin, uniform, corrosion-resistant film to the sharpened edges of razor blades comprising a chamber, a system coupled to said chamber for providing an environment of reduced pressure in said chamber, structure for supporting a multiplicity of razor blades with their bodies in face to face contact and their sharpened edges aligned with one another, an elongated target member disposed along a line parallel to the axis of said blade support structure, a screen interposed between said target and said blade support structure, said screen being electrically connected with said blade support structure, and circuitry for energizing said target member to cause transfer of material from said target member in a sputtering operation for passage through said screen for application to the sharpened edges of said razor blades to form a thin adherent corrosion-resistant coating on the sharpened edges of the razor blades in said stack, said screen have graduated transparency to sputtered material so that the thickness of the film deposited on the sharpened edges of the razor blades in said stack is substantially uniform.

10. The apparatus as claimed in claim 9 wherein said blade support structure is disposed around said elongated target for supporting a plurality of stacks of razor blades.

11. The apparatus as claimed in claim 9 wherein said screen has a first degree of transparency at a point adjacent the power supply connection to said chamber and greater transparency at a point remote from said power supply connection.

12. The apparatus as claimed in claim 9 wherein said screen has a first degree of transparency at a point adjacent the vacuum connection to said chamber and lesser transparency at a point remote from said vacuum connection.

13. The apparatus as claimed in claim 12 wherein said screen has a transparency of at least 4 mesh throughout its area.

14. The apparatus as claimed in claim 13 wherein said screen is cylindrical in form and the transparency of said screen is graduated in the axial direction parallel to the axis of said elongated target member and is uniform in the circumferential direction.

* * * * *